US012333211B1

(12) United States Patent
Harris et al.

(10) Patent No.: US 12,333,211 B1
(45) Date of Patent: Jun. 17, 2025

(54) CLOTHING COORDINATION SYSTEM

(71) Applicants: William Chris Harris, Alexandria, VA (US); Angela Harris, Alexandria, VA (US)

(72) Inventors: William Chris Harris, Alexandria, VA (US); Angela Harris, Alexandria, VA (US)

( * ) Notice: Subject to any disclaimer, the term of this patent is extended or adjusted under 35 U.S.C. 154(b) by 352 days.

(21) Appl. No.: 18/095,032

(22) Filed: Jan. 10, 2023

(51) Int. Cl.
*G06F 3/16* (2006.01)
*G06K 7/10* (2006.01)
*H04R 1/02* (2006.01)
*H04R 1/08* (2006.01)
*H04R 3/00* (2006.01)

(52) U.S. Cl.
CPC .............. *G06F 3/165* (2013.01); *G06F 3/162* (2013.01); *G06K 7/10386* (2013.01); *H04R 1/025* (2013.01); *H04R 1/08* (2013.01); *H04R 3/00* (2013.01); *H04R 2420/07* (2013.01)

(58) Field of Classification Search
CPC ........ G06F 3/165; G06F 3/162; G06F 3/0482; G06K 7/10386; G06K 7/00; G06K 19/07758; G06K 19/0723; G06K 19/027; H04R 1/025; H04R 1/08; H04R 3/00; H04R 2420/07; G10L 15/22; A47G 25/1407; A41D 1/00; A41D 1/005; G08B 13/2445; G11B 27/10
See application file for complete search history.

(56) References Cited

U.S. PATENT DOCUMENTS

| | | | |
|---|---|---|---|
| 9,594,996 | B2 | 3/2017 | Glasgow |
| 11,069,263 | B2 | 7/2021 | Dixon |
| 11,263,473 | B2 | 3/2022 | Kim |
| 2017/0277365 | A1 | 9/2017 | Gaidar |
| 2018/0189526 | A1 | 7/2018 | Botey |
| 2018/0253430 | A1 | 9/2018 | Grigorescu |
| 2019/0188449 | A1 | 6/2019 | Zhang |
| 2021/0150377 | A1 | 5/2021 | Xu |
| 2022/0101408 | A1 | 5/2022 | Penner |

FOREIGN PATENT DOCUMENTS

| | | | | |
|---|---|---|---|---|
| AU | 2017101141 | | 9/2017 | |
| JP | 2021509839 A | * | 4/2021 | ............... G06K 7/00 |
| KR | 20180061749 A | * | 6/2018 | ............... A61F 9/08 |
| WO | WO-2017062643 A1 | * | 4/2017 | ......... A47G 25/1407 |

* cited by examiner

*Primary Examiner* — Yogeshkumar Patel
(74) *Attorney, Agent, or Firm* — Kyle A. Fletcher, Esq.

(57) ABSTRACT

The clothing coordination system may comprise a tag and a tag manager. The clothing coordination system may be adapted to audibly identify a tagged item for a user. The tag may be coupled to the tagged item. The tag manager may be adapted to digitize a user's voice as the user verbally describes the tagged item. The tag manager may create a digital representation of the user's voice and may wirelessly transmit the digital representation to the tag where the digital representation May be stored within the tag. The tag manager may further be adapted to wirelessly receive the digital representation from the tag and to reproduce the user's voice as audio played through a sound transducer on the tag manager.

19 Claims, 3 Drawing Sheets

CLOTHING COORDINATION SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of closet systems and tools for the hearing impaired, more specifically, a clothing coordination system.

SUMMARY OF INVENTION

The clothing coordination system may comprise a tag and a tag manager. The clothing coordination system may be adapted to audibly identify a tagged item for a user. The tag may be coupled to the tagged item. The tag manager may be adapted to digitize a user's voice as the user verbally describes the 19 tagged item. The tag manager may create a digital representation of the user's voice and may wirelessly transmit the digital representation to the tag where the digital representation May be stored within the tag. The tag manager may further be adapted to wirelessly receive the digital representation from the tag and to reproduce the user's voice as audio played through a sound transducer on the tag manager.

An object of the invention is to provide a tag that may be coupled to a tagged item and a tag manager for wirelessly managing the tag.

Another object of the invention is for the tag manager to digitize a user's voice as the user describes the tagged item and to wireless transfer a digital representation of the user's voice to the tag where the digital representation may be stored within the tag.

A further object of the invention is for the tag manager to wirelessly retrieve the digital representation of the user's voice from the tag and to convert the digital representation to audio played through a sound transducer located on the tag manager.

Yet another object of the invention is to use a plurality of tags coupled to a plurality of items such that a visually impaired user may use the tag manager to coordinate the selection of items for an outfit.

These together with additional objects, features and advantages of the clothing coordination system will be readily apparent to those of ordinary skill in the art upon reading the following detailed description of the presently preferred, but nonetheless illustrative, embodiments when taken in conjunction with the accompanying drawings.

In this respect, before explaining the current embodiments of the clothing coordination system in detail, it is to be understood that the clothing coordination system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the clothing coordination system.

It is therefore important that the claims be regarded as including such equivalent construction insofar as they do not depart from the spirit and scope of the clothing coordination system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
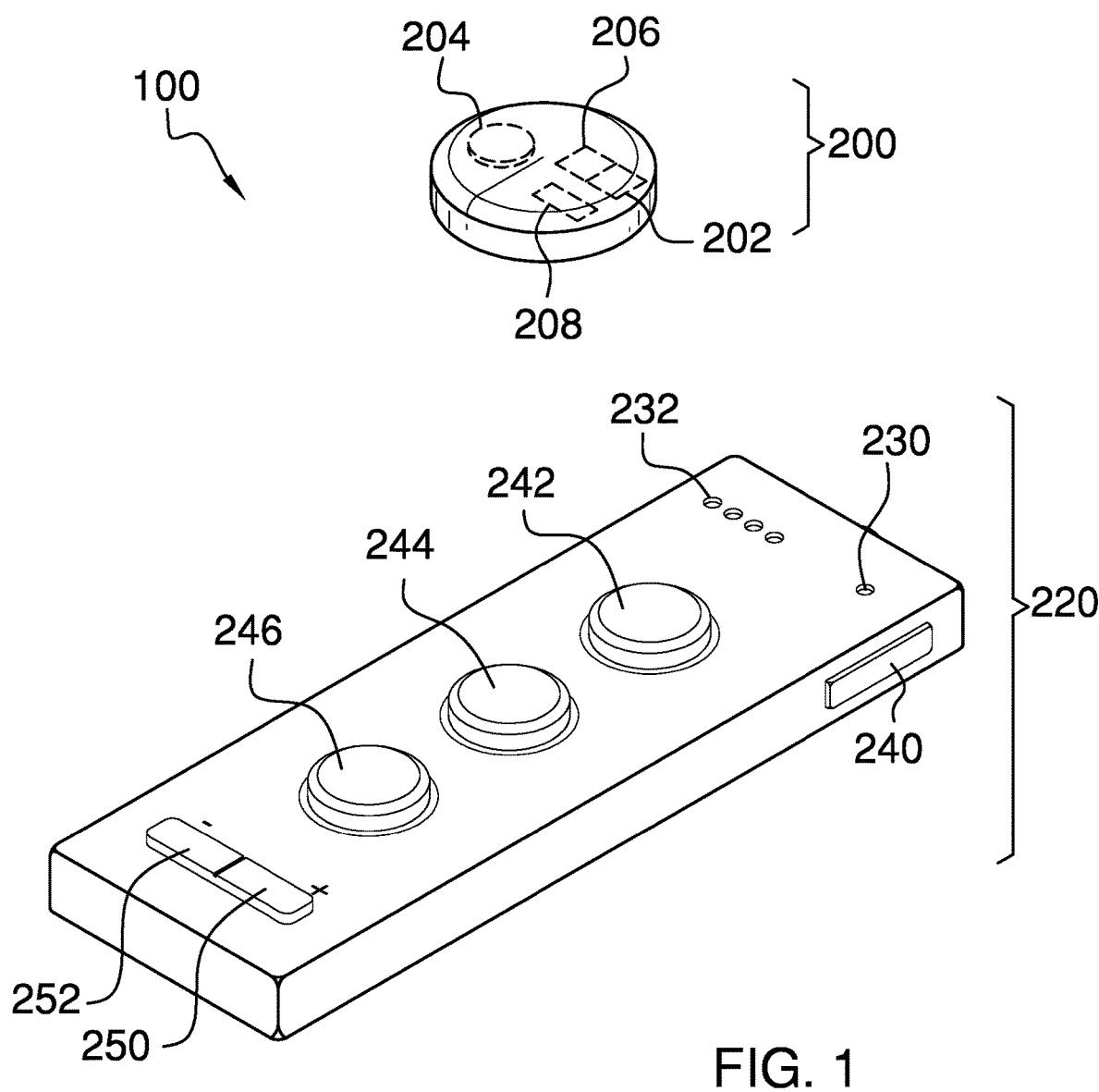
FIG. 1 is an isometric view of an embodiment of the disclosure.
Figure 2:
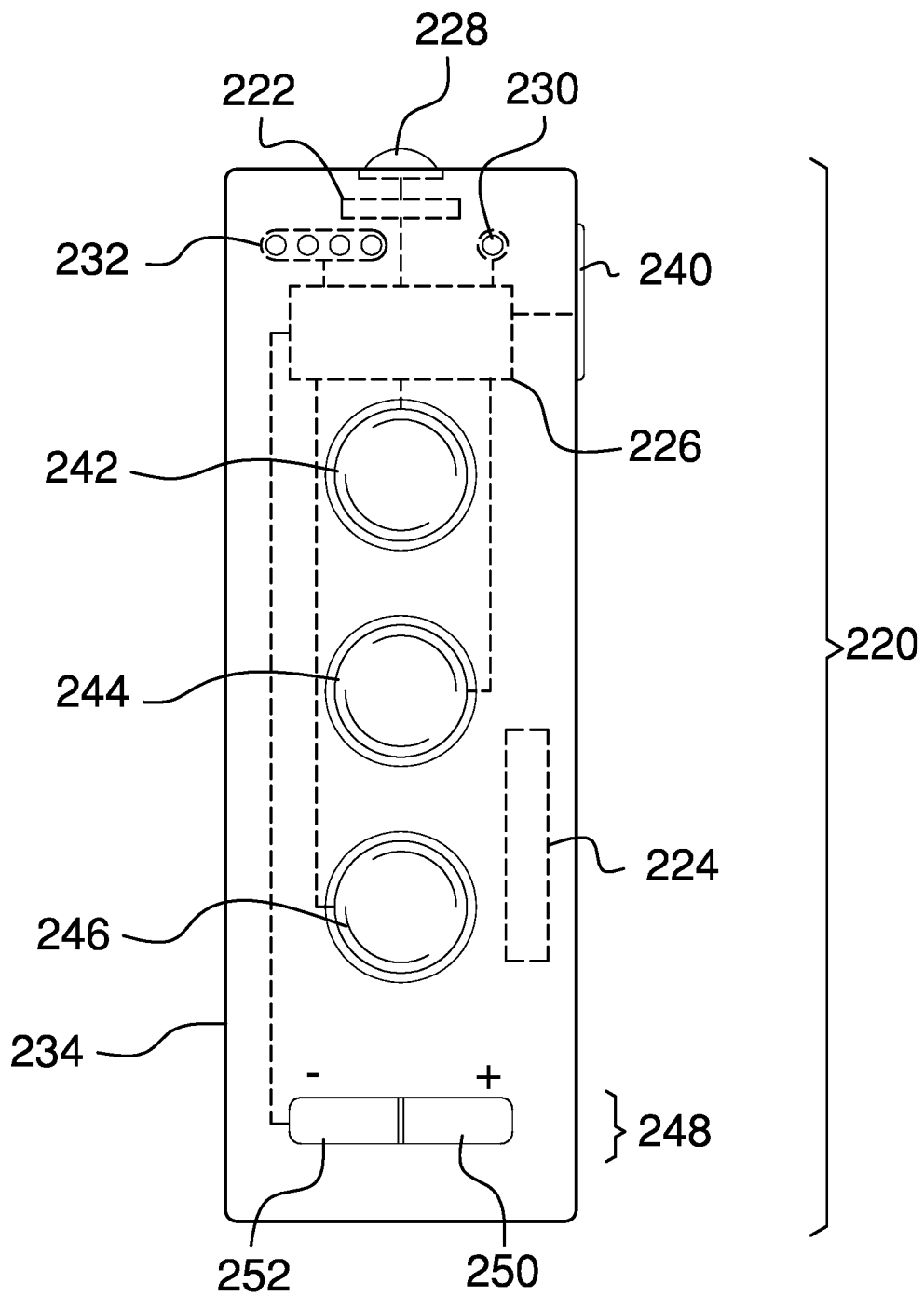
FIG. 2 is a front detail view of an embodiment of the disclosure.
Figure 3:
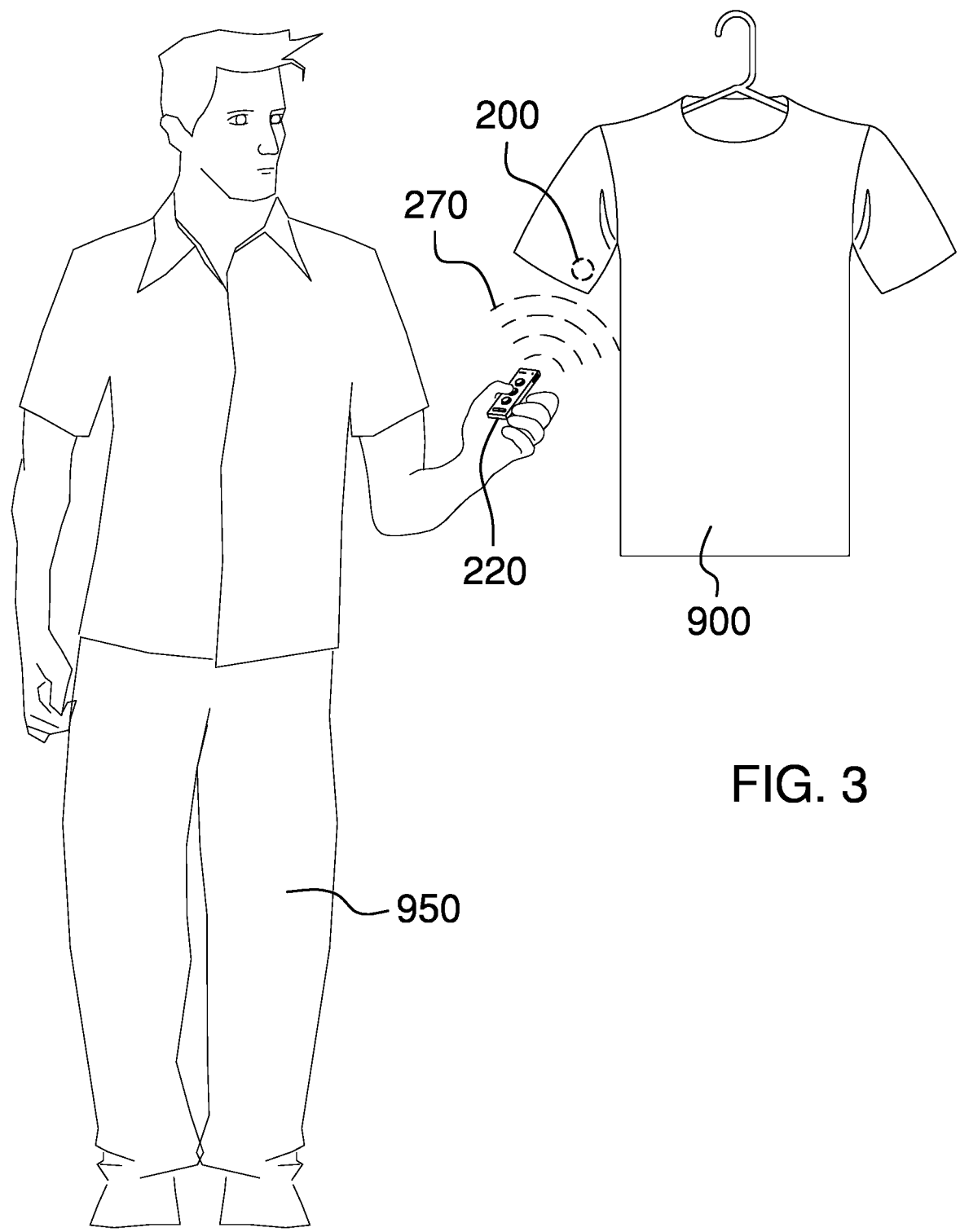
FIG. 3 is an in-use view of an embodiment of the disclosure.

Detailed reference will now be made to a first potential embodiment of the disclosure, which is illustrated in FIGS. 1 through 3.

The clothing coordination system 100 (hereinafter invention) comprises a tag 200 and a tag manager 220. The invention 100 may be adapted to audibly identify a tagged item for a user 950. The tag 200 may be coupled to the tagged item 900. The tag manager 220 may be adapted to digitize a user's voice as the user 950 verbally describes the tagged item 900. The tag manager 220 may create a digital representation of the user's voice and may wirelessly transmit the digital representation to the tag 200 where the digital representation may be stored within the tag 200. The tag manager 220 may further be adapted to wirelessly receive the digital representation from the tag 200 and to reproduce the user's voice as audio played through a sound transducer 232 on the tag manager 220.

As non-limiting examples, the tagged item 900 may be a garment, a pair of shoes, or an accessory such as a purse. The user 950 may be visually impaired or may be located at a venue with a low ambient light level such as a closet in pre-dawn hours where identifying the color, style, size, brand, and other attributes of the tagged item 900 may be problematic. If the user 950 is visually impaired they may record the description of the tagged item 900 with the assistance of a sighted person or after purchase while labels bearing tactile markings are present on the tagged item 900.

The tag 200 may be an electronic device that may be coupled to the tagged item 900. As non-limiting examples, the tag 200 may be coupled to the tagged item 900 by sewing, adhering, or enclosing in a sealable pocket on the tagged item 900. In some embodiments, the tag 200 may be waterproof.

The tag 200 may comprise a tag transceiver 202, a tag battery 204, and a tag controller 206. The tag transceiver 202 may be operable to wirelessly communicate with a manager transceiver 222 that is located in the tag manager 220 over a wireless communication link 270. The digital representation of the user's voice may be received from the tag manager 220 via the tag transceiver 202 and may be stored within the tag 200. The digital representation of the user's voice stored within the tag 200 may be sent from the tag 200 to the tag manager 220 via the tag transceiver 202.

The tag transceiver 202 and the manager transceiver 222 may communicate using compatible wireless interfaces and protocols. As non-limiting examples, the wireless interfaces and protocols may be defined by Near Field Communication (NFC) standards, Bluetooth Low Energy (BLE) standards, or other lower power wireless communication standards.

The tag battery 204 may comprise one or more energy-storage devices. The tag battery 204 may be a source of electrical energy to operate the tag transceiver 202, the tag controller 206, and one or more memory chips 208 located within the tag 200. The tag battery 204 may be rechargeable and/or replaceable.

The tag controller 206 may be operable to control the sequencing and timing of the tag 200. As non-limiting examples, the tag controller 206 may control the transmission of outgoing messages sent by the tag transceiver 202, may receive incoming messages arriving at the tag transceiver 202, and may manage the writing and reading of the one or more memory chips 208. The tag controller 206 may receive the digital representation of the user's voice from the tag manager 220 via the tag transceiver 202 and may write the digital representation to the one or more memory chips 208. The tag controller 206 may read the digital representation of the user's voice from the one or more memory chips 208 and may transmit the digital representation to the tag manager 220 via the tag transceiver 202.

The tag manager 220 may be a hand-held electronic device that may be adapted to be operated by the user 950. Under control of the user 950, the tag manager 220 may digitize the user's voice and transmit the digital representation of the user's voice to the tag 200. The tag manager 220 may also receive the digital representation of the user's voice from the tag 200 and may audibly reproduce the user's voice.

The tag manager 220 may comprise the manager transceiver 222, a manager battery 224, a manager controller 226, a microphone 230, the sound transducer 232, and a plurality of operator controls. The manager transceiver 222 may be operable to wirelessly communicate with the tag transceiver 202 that is located in the tag 200. The digital representation of the user's voice may be transmitted to the tag 200 from the tag manager 220 via the manager transceiver 222. The digital representation of the user's voice sent by the tag 200 may be received by the manager transceiver 222 and may be passed to the manager controller 226. The tag manager 220 may be operable to communicate, one at a time, with a plurality of the tags 200, by placing an antenna 228 located on the tag manager 220 adjacent to one of the tags 200.

The manager battery 224 may comprise one or more energy-storage devices. The manager battery 224 may be a source of electrical energy to operate the manager transceiver 222, the manager controller 226, the microphone 230, the sound transducer 232, and the plurality of operator controls. The manager battery may be rechargeable and/or replaceable.

The manager controller 226 may be operable to control the sequencing and timing of the tag manager 220. As non-limiting examples, the manager controller 226 may control the transmission of outgoing messages sent by the manager transceiver 222, may receive incoming messages arriving at the manager transceiver 222, may monitor and respond to actuations of the plurality of operator controls, may digitize the user's voice picked up by the microphone 230, and reproduce the user's voice via the sound transducer 232.

The microphone 230 may be a transducer that converts sound to an input audio signal. The input audio signal may be passed to an ADC input on the manager controller 226. The manager controller 226 may convert the input audio signal into the digital representation of the sound.

The digital representation of the user's voice may be converted to an output audio signal by a DAC output of the manager controller 226. The sound transducer 232 may convert the output audio signal into an audible sound reproducing the user's voice.

The plurality of operator controls may be adapted for the user 950 to actuate in order to control operation of the tag manager 220. The plurality of operator controls may comprise an on/off control 240, a record control 242, a playback control 244, a delete control 246, and a volume control 248. The plurality of operator controls may be accessible from outside of a tag manager enclosure 234.

The on/off control 240 may apply power to the tag manager and may remove power from the tag manager 220. As non-limiting examples, an actuation of the on/off control 240 may apply power to the tag manager 220 if the tag manager 220 is off and may remove power from the tag manager 220 if the tag manager is on. The tag manager 220 must be on in order to communicate with the tags 200.

The record control 242 may cause the manager controller 226 to digitize the user's voice while the record control 242 is actuated by pressing and may cause the manager controller 226 to transmit the digital representation of the user's voice to the tag 200 when the record control 242 is released. Responsive to the transmission of the digital representation from the tag manager 220, the tag 200 may store the digital representation within the tag 200.

The playback control 244 may cause the manager controller to request transmission of the digital representation of the user's voice from the tag 200 to the tag manager 220 when the playback control 244 is actuated. Responsive to the reception of the digital representation from the tag 200 by the tag manager 220, the manager controller 226 may convert the digital representation to the output audio signal and pass the output audio signal to the sound transducer 232 such that the user's voice is audibly reproduced.

The delete control 246 may be operable to erase the digital representation stored within the tag 200 when the delete control is actuated.

The volume control 248 may be operable to vary the playback volume of the tag manager 220. Specifically, the volume control 248 may comprise a volume up control 250 and a volume down control 252. The volume up control 250 may increase the volume of the output audio signal that is reproduced by the sound transducer 232 and the volume down control 252 may decrease the volume of the output audio signal that is reproduced by the sound transducer 232.

In use, the user 950 may couple a tag 200 to a tagged item 900. As non-limiting examples, the tagged item 900 may comprise a garment, a pair of shoes, or an accessory. The user 950 may couple the tags 200 to many such items so that the tagged items may later be selected to coordinate an outfit. Each time a tag 200 is coupled to a tagged item 900, the user's voice may be recorded and stored within the tag 200 by bringing the tag manager 220 into the proximity of the tag 200, pressing the record control 242, and speaking a description. As non-limiting examples, the user 950 who is visually impaired may record the description of the tagged item 900 with the assistance of a sighted person or after purchase while labels bearing tactile markings are present on the tagged item 900.

The user 950 may coordinate the selection of the tagged items 900 making up the outfit by bringing the tag manager 220 into proximity of the tagged item 900 and pressing the playback control 244. The tag manager 220 may then retrieve the digital representation of the user's voice from the tag 200 and reproduce the user's voice describing the tagged item 900. If the description describes an item to be include in the outfit, then the user 950 may select the tagged item 900 for inclusion in the outfit. Additional items may be selected in the same way until the outfit is complete.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, "Bluetooth" may refer to a standardized communication protocol that is used to wirelessly interconnect electronic devices. Bluetooth® is a registered trademark of Bluetooth SIG.

As used herein, "BLE" may refer to Bluetooth Low Energy. BLE is a wireless personal are network technology designed and promoted by Bluetooth SIG. BLE is intended to provide a communication range that is similar to Classic Bluetooth while consuming considerably less power. BLE and Classic Bluetooth are not compatible however they may coexist.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw. In some embodiments, a control may alter an electrical property of a circuit such as resistance, inductance, or capacitance.

As used herein, the words "couple", "couples", "coupled" or "coupling", may refer to connecting, either directly or indirectly, and does not necessarily imply a mechanical connection.

As used in this disclosure, a "microphone" may be a transducer that converts the energy from vibration into electrical energy. The sources of vibrations include, but are not limited to, acoustic energy.

As used in this disclosure, "near field communication" commonly called NFC, may refer to an RFID technology and communication protocol that is commonly implemented on personal data devices.

As used herein, "outfit" may refer to a garment or accessory that may be worn or to a grouping of such garments and accessories. The garments and accessories making up an outfit may be coordinated to match in some way. As a non-limiting example, the outfit may be coordinated by comprising compatible colors.

As used in this disclosure, a "pocket" may be a pouch or storage space that is formed into an object. Pockets are often formed by joining a second textile or a second sheeting to a first textile or a first sheeting, respectively, by sewing or heat sealing respectively.

As used herein, the words "printed", "marked", and "marking" may refer to a mark that has been made on an object. The process of making the mark may involve printing, lithography, thermal transfer, painting, embossing, molding, burning, silk-screening, drawing, etching, engraving, stenciling, stamping, spraying of pigments, or other processes which result in the controlled change of coloration and/or shape of a surface.

As used in this disclosure, a "transceiver" may be a device that is used to transmit and/or receive signals. The signals may be audible, optical, or RF in nature.

As used in this disclosure, a "transducer" may be a device that converts a physical quantity, such as pressure or brightness into an electrical signal or a device that converts an electrical signal into a physical quantity.

As used herein, "visually impaired" may refer to a person who experiences a visual impairment. A visual impairment may comprise blindness, loss of visual acuity, loss of visual field, photophobia, diplopia, visual distortion, visual perception difficulties, or combinations thereof.

As used herein, the word "waterproof" may refer to an object that is not harmed when being exposed to water, including total submersion for a period of time. When used as a verb, "waterproof" may refer to taking steps to make an object waterproof. Non-limiting examples of such steps may include applying special coatings or using gaskets to seal seams and entry points of an enclosure.

As used in this disclosure, "wireless" may be an adjective that is used to describe a communication channel that does not require the use of physical cabling.

With respect to the above description, it is to be realized that the optimum dimensional relationship for the various components of the invention described above and in FIGS. 1 through 3, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A clothing coordination system comprising:
a tag and a tag manager;
wherein the clothing coordination system is adapted to audibly identify a tagged item for a user;
wherein the tag is coupled to the tagged item;
wherein the tag manager is adapted to digitize a user's voice as the user verbally describes the tagged item;
wherein the tag manager creates a digital representation of the user's voice and wirelessly transmits the digital representation to the tag where the digital representation is stored within the tag;
wherein the tag manager is further adapted to wirelessly receive the digital representation from the tag and to reproduce the user's voice as audio played through a sound transducer on the tag manager;
wherein the tag is further defined with a tag transceiver, one or more memory chips, and a tag controller;
wherein the tag controller is operable to control a sequencing and a timing of the tag;
wherein the tag controller receives a digital representation of the user's voice from the tag manager via the tag transceiver and writes the digital representation to the one or more memory chips;
wherein the tag controller reads the digital representation of the user's voice from the one or more memory chips and transmits the digital representation to the tag manager via the tag transceiver.

2. The clothing coordination system according to claim 1 wherein the tag is an electronic device that is coupled to the tagged item.

3. The clothing coordination system according to claim 2 wherein the tag is waterproof.

4. The clothing coordination system according to claim 2 wherein the tag comprises the tag transceiver, a tag battery, and the tag controller;
wherein the tag transceiver is operable to wirelessly communicate with a manager transceiver that is located in the tag manager over a wireless communication link;
wherein the digital representation of the user's voice is received from the tag manager via the tag transceiver and is stored within the tag;
wherein the digital representation of the user's voice stored within the tag is sent from the tag to the tag manager via the tag transceiver.

5. The clothing coordination system according to claim 4 wherein the tag transceiver and the manager transceiver communicate using compatible wireless interfaces and protocols.

6. The clothing coordination system according to claim 5 wherein the tag battery comprises one or more energy-storage devices;
wherein the tag battery is a source of electrical energy to operate the tag transceiver, the tag controller, and the one or more memory chips located within the tag;
wherein the tag battery is rechargeable and/or replaceable.

7. The clothing coordination system according to claim 5 wherein the tag manager is a hand-held electronic device that is adapted to be operated by the user;
wherein the tag manager digitizes the user's voice and transmits the digital representation of the user's voice to the tag;
wherein the tag manager receives the digital representation of the user's voice from the tag and audibly reproduces the user's voice.

8. The clothing coordination system according to claim 7 wherein the tag manager comprises the manager transceiver, a manager battery, a manager controller, a microphone, the sound transducer, and a plurality of operator controls;
wherein the manager transceiver is operable to wirelessly communicate with the tag transceiver that is located in the tag;
wherein the digital representation of the user's voice is transmitted to the tag from the tag manager via the manager transceiver;
wherein the digital representation of the user's voice sent by the tag is received by the manager transceiver and is passed to the manager controller;
wherein the tag manager is operable to communicate, one at a time, with a plurality of the tags, by placing an antenna located on the tag manager adjacent to one of the tags.

9. The clothing coordination system according to claim 8 wherein the manager battery comprises one or more energy-storage devices;
wherein the manager battery is a source of electrical energy to operate the manager transceiver, the manager controller, the microphone, the sound transducer, and the plurality of operator controls;
wherein the manager battery is rechargeable and/or replaceable.

10. The clothing coordination system according to claim 9 wherein the manager controller is operable to control the sequencing and timing of the tag manager.

11. The clothing coordination system according to claim 10 wherein the microphone is a transducer that converts sound to an input audio signal;
wherein the input audio signal is passed to an ADC input on the manager controller;
wherein the manager controller converts the input audio signal into the digital representation of the sound.

12. The clothing coordination system according to claim 11 wherein the digital representation of the user's voice is converted to an output audio signal by a DAC output of the manager controller;
wherein the sound transducer converts the output audio signal into an audible sound reproducing the user's voice.

13. The clothing coordination system according to claim 12 wherein the plurality of operator controls are adapted for the user to actuate in order to control operation of the tag manager;

wherein the plurality of operator controls comprise an on/off control, a record control, a playback control, a delete control, and a volume control;

wherein the plurality of operator controls are accessible from outside of a tag manager enclosure.

14. The clothing coordination system according to claim 13 wherein the on/off control applies power to the tag manager and removes power from the tag manager.

15. The clothing coordination system according to claim 14 wherein an actuation of the on/off control applies power to the tag manager if the tag manager is off and removes power from the tag manager if the tag manager is on.

16. The clothing coordination system according to claim 15 wherein the record control causes the manager controller to digitize the user's voice while the record control is actuated by pressing and causes the manager controller to transmit the digital representation of the user's voice to the tag when the record control is released;

wherein responsive to the transmission of the digital representation from the tag manager, the tag stores the digital representation within the tag.

17. The clothing coordination system according to claim 16 wherein the playback control causes the manager controller to request transmission of the digital representation of the user's voice from the tag to the tag manager when the playback control is actuated;

wherein responsive to the reception of the digital representation from the tag by the tag manager, the manager controller converts the digital representation to the output audio signal and passes the output audio signal to the sound transducer such that the user's voice is audibly reproduced.

18. The clothing coordination system according to claim 17 wherein the delete control is operable to erase the digital representation stored within the tag when the delete control is actuated.

19. The clothing coordination system according to claim 18 wherein the volume control is operable to vary the playback volume of the tag manager;

wherein the volume control comprises a volume up control and a volume down control;

wherein the volume up control increases the volume of the output audio signal that is reproduced by the sound transducer and the volume down control decreases the volume of the output audio signal that is reproduced by the sound transducer.

* * * * *